United States Patent

De Ment et al.

[11] 4,027,513
[45] June 7, 1977

[54] SEALING DEVICE FOR CAN TESTING MACHINES

[75] Inventors: Robert B. De Ment, Steger; William D. Simms, Chicago, both of Ill.

[73] Assignee: Kastalon Inc., Alsip, Ill.

[22] Filed: Mar. 31, 1976

[21] Appl. No.: 672,111

[52] U.S. Cl. .................................. 73/49.8; 73/49.2
[51] Int. Cl.² .......................................... G01M 3/32
[58] Field of Search ................. 73/49.8, 49.2, 45.1

[56] References Cited

UNITED STATES PATENTS

| | | | |
|---|---|---|---|
| 1,606,486 | 11/1926 | Stevens | 73/49.2 |
| 3,198,004 | 8/1965 | Roberts et al. | 73/45.1 |
| 3,213,673 | 10/1965 | Schulhoff, Sr. | 73/49.2 |
| 3,577,770 | 5/1971 | Shaw et al. | 73/49.8 |
| 3,622,427 | 11/1971 | Kelly | 73/49.8 X |
| 3,672,208 | 6/1972 | Pearce | 73/49.2 |

*Primary Examiner*—Richard C. Queisser
*Assistant Examiner*—Joseph W. Roskos
*Attorney, Agent, or Firm*—Richard J. Myers

[57] ABSTRACT

An improved, long lasting sealing ring for closing the open end of a can while vacuum is applied thereto to test for porosity. The ring comprises an outer pad of soft elastomer material made preferably of polyeurathane of relatively low durometer and having an internal cavity with a peripheral groove into which is fitted a mounting assembly comprising an annular steel or metal adapter plate encased within a relatively hard durometer elastomer, preferably polyeurathane, disk which has a novel sharp-edged peripheral configuration which functions to embed into an inturned flange on the pad and thus effectively seals the disk with the pad.

10 Claims, 3 Drawing Figures

SEALING DEVICE FOR CAN TESTING MACHINES

DISCUSSION OF THE PRIOR ART

Can testing machines using a vacuum draw differential as a media for testing can porosity, have been employed in the industry for many years (see U.S. Pat. Nos. 1,649,287; 3,672,208; and 3,423,990). The testing is done on the line with the cans loaded previously into individual chambers attached to a continuous chain conveyor.

The chambers with the cans are advanced to the testing head one at a time, and for a brief period of time a vaccum draw is applied to the can and chamber.

Retention of the vacuum draw for a given period of time insures that the can is porosity free.

The problem with the testers in industry is either that they are short-lived or expensive or require inordinately high pressure loading against the rim of the can and/or vacuum chamber to seal.

SUMMARY OF THE INVENTION

This invention pertains to a novel sealing ring assembly which is of simple construction and is easy to adapt to present equipment and operates under relatively low loading.

A more specific object is to provide a novel sealing ring assembly which incorporates a mounting structure and a separable sealing pad.

A further object is to provide a novel sealing structure between the mounting assembly and the sealing pad in which the mounting assembly provides an annular axially directed sharp edge which impales into an overlapping retaining and sealing flange of the pad.

A corollary object is to provide a pad and holder assembly wherein the pad has an inwardly directed retaining lip which fits between a flat sealing surface on the holder and a sharp, annular, axially directed edge on adapter plate composite which provides an attachment for the pad to the holder.

Another object is to provide a mounting for the sealing pad assembly to the holder which permits the pad assembly to move axially toward and away with respect to an opposing sealing surface on the holder whereby the sealing pad at each application is caused to compress and seal with the container and/or the vacuum chamber and also against the holder and at the same time sealingly grasp the retainer assembly about its periphery and flow into a uniquely designed, axially open annular channel or groove to accommodate advantageous flow of the pad material which insures a good seal which will not displace under vacuum and thus leak, thereby resulting in a discard of a perfectly good container by associated discard mechanism.

These and other objects and advantages inherent in and encompassed by the invention will become more readily apparent from the specification and the drawings, wherein.

DESCRIPTION OF THE INVENTION

Figure 1:
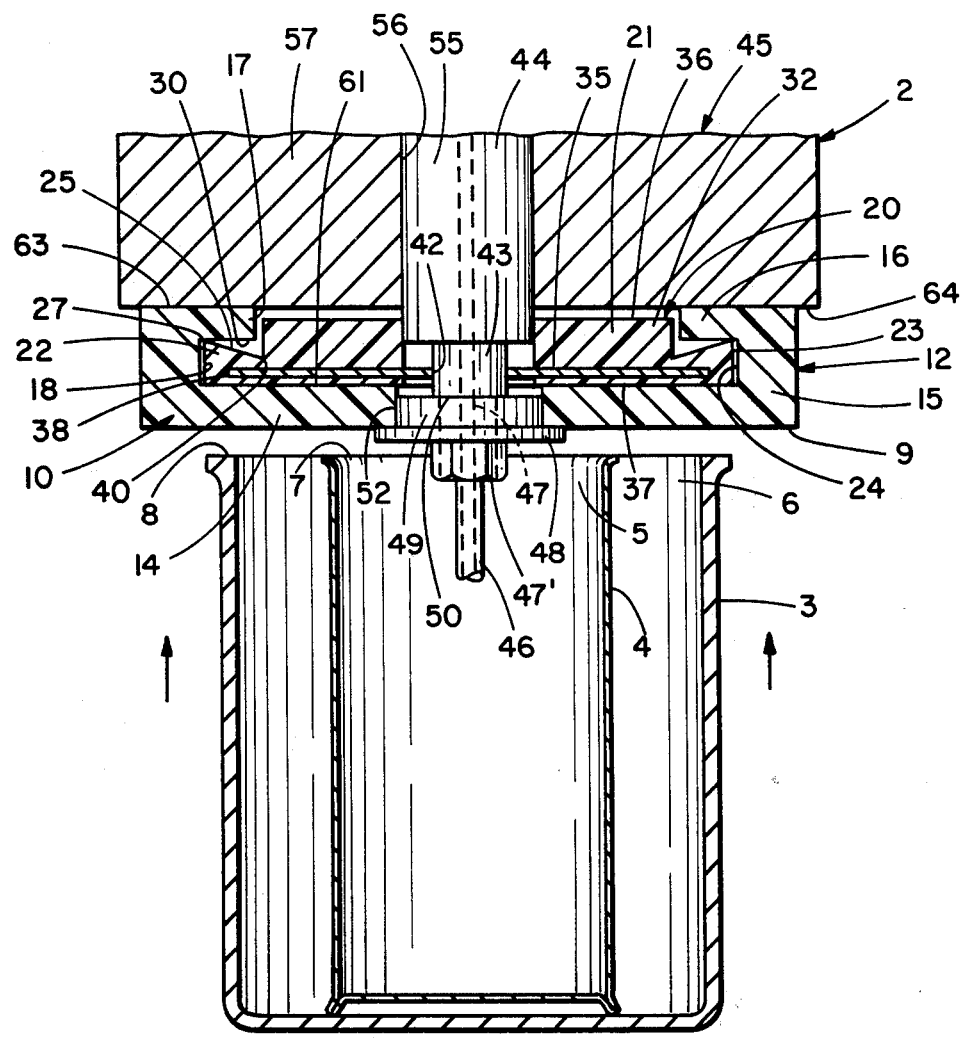
FIG. 1 is an axial sectional view of the invention shown in association with a can to be tested in a vacuum chamber prior to testing.

The invention is shown in connection with can testing equipment generally designated 2, comprising a vacuum chamber or container 3 and a can 4 to be tested. The can is positioned within the container. The can and container have upper open ends 5 and 6 respectively defined by coplanor edges 7 and 8, which oppose the external of bottom normally flat side 9 of a sealing pad 10 of a sealing assembly 12.

The pad 10 is made of elastomer, preferably of soft polyeurathane of about 10 to 15 durometer and is a cylindrical member having a bottom wall 14 and a cylindrical side wall 15 and an inturned annular retainer flange 16 at the upper end of the side wall 15. The flange 16 defines a circular opening 17 which leads into an internal cavity 18 within the pad 10.

An adaptor or mounting assembly 20 is fitted within the cavity 18 and has a body 21 of polyeurathane of about 50 to 70 durometer and includes a peripheral annulus 22 which fits at its annular edge 23 complementally within the interior cylindrical surface 24 of the cylindrical body wall 15 of the pad.

The annulus or ring 22 has a frusto conical upper edge surface 25 which terminates at and joins with the surface 23 in an apical circular continuous edge 27 which contacts as at 28 the flat bottom surface 30 of the inturned retainer flange 16. Surface 30 in the unstressed condition is normal to the axis of the sealing ring.

The body or disk 21 has a reduced diameter cylindrical centered portion 32 integral with the sealing annulus portion 22 and at its upper end projects into the opening 17.

A steel circular plate 35 is bonded within the body 21 and extends parallel with the flat top and bottom sides 36,37 of the body 21 but is of a diameter such that its peipheral edge 38 is located intermediate the inner and outer edges 40 and 23 of the outer ring portion 22 which is wedge-shaped in cross-section.

The plate 35 has a central round aperture or opening 42 which slidably fits complementally over a cylindrical reduced lower end portion 43 of a mounting shaft or spindle 44 of the sealing head generally designated 45.

A pipe 46 is threaded on the lower end of shaft 44 in a bore 47 in the shaft and a nut 47' sleeved over the pipe or tube 46 is threaded on the lower end of the shaft and holds a washer 48 and a spacer 49 thereon, the spacer abutting a shoulder 50 on the shaft and fitting tightly within an opening 52 in the lower wall 14 of the pad.

It will be observed that the retainer disk body 21 has a central opening 42 which is of smaller diameter than opening 56 in the body 32 which fits over the large diameter portion 55 of the shaft. The shaft portion 55 is fitted within a bore 56 in the head base 57.

Figure 2:
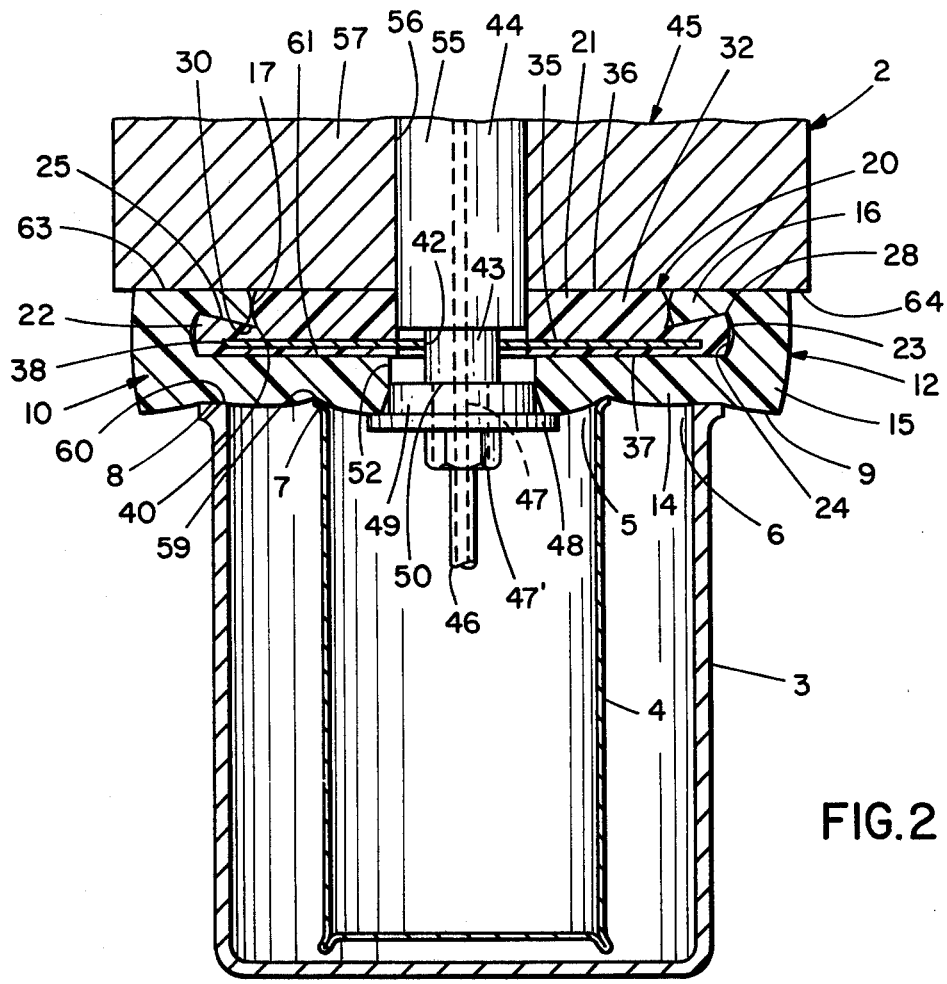
FIG. 2 is a view comparable to FIG. 1 showing the parts in can testing position.
Figure 3:
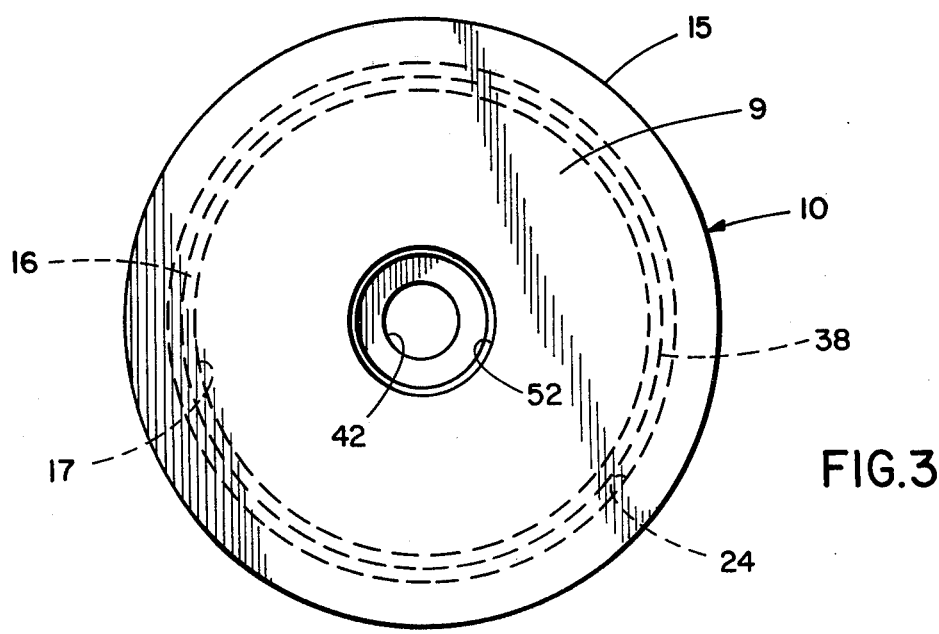
FIG. 3 is a bottom plan view of the sealing pad.

In operation the container 3 and can 4 are engaged by the sealing ring causing the flat bottom side 9 of the bottom wall to deform at 59 and 60 (FIG. 2) and lifting the pad to tightly engage the top side 61 with the bottom side 37 of the body 21. At the same time the top end 36 and top side of 63 of the retainer flange 16 is pressed flat against the opposing flat surface 64 on the base 57 of head 45. Also, simultaneously the bottom side of the retainer flange is deformed to fit into and fill the frusto-conical notch on the top side of the annulus of the retainer body 21.

As the vacuum is drawn through the tube 46, a leak-tight fit is obtained along the interfaces between the locking ring portion 22 and the retainer flange of the pad and the bottom side of the bottom wall of the pad is further puckered to seal tightly with the rims of the can, and if the can leaks then such vacuum also draws the container toward the pad.

It has been noted that the edge 27 embeds into the retainer flange and makes the assembly impervious. The pad is easily removed and replaced when it becomes worn simply by stripping it off the retainer and a new pad is easily stretched over the retainer.

Having described a preferred embodiment of the invention, it will be appreciated that various forms will now become apparent and fall within the scope of the appended claims.

We claim:

1. A sealing assembly suitable for use in a can body testing machine of the type adapted to pass fluid through the can, said assembly comprising an interior support and an exterior elastomeric pad sleeved thereon for positioning over the rim of a can, said pad and support having opposing interfaces and one of said interfaces presenting a peripheral annular apical axially directed edge portion and the other interface having a surface deformable against said edge portion attendant to compaction of the support and pad between a can body and an opposing machine surface to a shape conforming to said one interface to provide a leak-proof seal therebetween, said pad being resilient along the surface thereof engageable with the rim of the can so as to establish a hermetic seal therewith.

2. The invention according to claim 1 and said one interface being frusto-conical.

3. The invention according to claim 1 and said pad being made of elastomer material of low durometer.

4. The invention according to claim 3 and said material being a soft polyeurathane.

5. The invention according to claim 3 and said support at least at said interface being made of elastomer material of harder durometer than said pad.

6. The invention according to claim 5 and said support comprising a rigid metalic backing member.

7. The invention according to claim 1 and said pad comprising a bottom having a flat can engaging surface, a cylindrical body wall and a top inturned retainer flange defining with said bottom wall and body wall a support-receiving cavity, said pad being expandable for removal and application to the support and having a sphincteral grip upon said support in the assembled position therewith.

8. The invention according to claim 1 and said support having a cylindrical body within said edge portion and defining a notch therewith open toward one end of the support and said pad having a portion overlapping the notch.

9. The invention according to claim 8 and said pad being of relatively low durometer and said support havng a cladding of hard durometer deflection-resisting material.

10. The invention according to claim 1 and said sealing assembly comprising a vacuum line extending through the sealing assembly and projecting below the same for entry into a can to be tested.

* * * * *